(12) United States Patent
Newson et al.

(10) Patent No.: US 7,412,542 B1
(45) Date of Patent: Aug. 12, 2008

(54) BRIDGING A GAMING CONSOLE WITH A WIRELESS NETWORK

(75) Inventors: Paul E. Newson, Redmond, WA (US); Benjamin O. Zotto, Seattle, WA (US); Neel R. S. Malik, Seattle, WA (US); Robert D. Young, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 963 days.

(21) Appl. No.: 10/722,958

(22) Filed: Nov. 26, 2003

(51) Int. Cl.
G06F 15/16 (2006.01)
G06F 15/177 (2006.01)
G06F 15/173 (2006.01)
H04K 1/00 (2006.01)

(52) U.S. Cl. .............. 709/249; 709/220; 709/225; 709/227; 709/228; 709/250; 380/251; 380/270

(58) Field of Classification Search ............ 709/249
See application file for complete search history.

(56) References Cited

U.S. PATENT DOCUMENTS

| | | | | |
|---|---|---|---|---|
| 5,671,355 A * | 9/1997 | Collins | ...... | 709/250 |
| 5,819,042 A * | 10/1998 | Hansen | ...... | 709/222 |
| 5,896,512 A * | 4/1999 | Einbinder et al. | ...... | 709/250 |
| 6,106,396 A * | 8/2000 | Alcorn et al. | ...... | 463/29 |
| 6,272,120 B1 * | 8/2001 | Alexander | ...... | 370/338 |
| 6,516,345 B1 * | 2/2003 | Kracht | ...... | 709/220 |
| 6,522,881 B1 * | 2/2003 | Feder et al. | ...... | 455/437 |
| 6,638,170 B1 * | 10/2003 | Crumby | ...... | 463/42 |
| 6,865,673 B1 * | 3/2005 | Nessett et al. | ...... | 713/155 |
| 6,958,996 B2 * | 10/2005 | Xiong | ...... | 370/389 |
| 7,096,490 B2 * | 8/2006 | Xiong et al. | ...... | 726/3 |
| 7,103,661 B2 * | 9/2006 | Klein | ...... | 709/225 |
| 7,363,358 B2 * | 4/2008 | Sullivan | ...... | 709/222 |
| 2002/0065941 A1 * | 5/2002 | Kaan et al. | ...... | 709/249 |
| 2003/0140344 A1 * | 7/2003 | Bhatti | ...... | 725/62 |
| 2004/0125744 A1 * | 7/2004 | Perrot et al. | ...... | 370/212 |

OTHER PUBLICATIONS

Linksys. 2003. "Wireless-G Game Adapter User Guide." 24pp. Available: http://www.linksys.com/products/product.asp?grid=33&scid=38&prid=558.
Linksys. nd. "Wireless-G Game Adapter Quick Installation." 1pg. Available: www.linksys.com.
D-Link Systems, Inc. 2003. "AirPlusXtremeG: High-Speed 802.11 g Wireless Bridge." 2pp. Available: www.dlink.com.

* cited by examiner

*Primary Examiner*—Nathan J. Flynn
*Assistant Examiner*—Daniel Murray
(74) *Attorney, Agent, or Firm*—Workman Nydegger

(57) ABSTRACT

Apparatus and system for configuring a wireless bridge for a computing device such as a game console. The wireless bridge must include a key (not known to the public) employed in producing a digest. The digest is passed to the game console to authenticate that the wireless bridge is compatible and can thus be configured by the game console. Once the wireless bridge proves its compatibility, a configuration procedure included in an operating system on the game console configures the wireless bridge to connect to a wireless network so that the game console can communicate through the wireless bridge with a gaming site that is accessed over the Internet. The configuration is done without using a web browser program or a configuration program that is specific to a particular model and manufacturer of the wireless bridge.

19 Claims, 10 Drawing Sheets

BRIDGING A GAMING CONSOLE WITH A WIRELESS NETWORK

FIELD OF THE INVENTION

This invention generally pertains to a wireless bridge that is adapted to connect through a wire connection to a computing device to enable the computing device to communicate over a wireless network and to a method for configuring the wireless bridge, and more specifically, pertains to a wireless bridge that is designed to be configured by a specific computing device, and to a method for configuring such a wireless bridge with a user interface executed on the computing device.

BACKGROUND OF THE INVENTION

One of the more popular options available to users of Microsoft Corporation's XBOX™ game console is the ability to connect over the Internet to Microsoft Corporation's XBOX LIVE™ gaming service. Although the XBOX game console is a computing device that can be programmed to do much more than play electronic games, the game console is not provided with a web page browser program and is not designed for browsing web sites on the Internet, like a personal computer (PC). Instead, the game console is designed to connect via the Internet to the XBOX LIVE™ gaming service through a virtual private network (VPN) tunnel that provides a very secure communication link to enable user(s) of the game console to play online games with other XBOX game console users who are also subscribers to this online gaming service. The game console does not include any program for displaying a web page that includes hypertext markup language (HTML) code. To make a broadband connection to a local area network (LAN) for accessing the Internet, the XBOX game console includes an Ethernet port. This connection is intended to serve as the communication link for the game console to access the Internet through a digital subscriber line (DSL), a cable modem, or other network broadband connection. While certain games can be played at the communication speeds available through a plain old telephone service (POTS) connection, there is a benefit in requiring that all users use a broadband so that all users will then experience a similar low response latency and rapid download of data from the gaming service and from each other. For this reason, the game console is only able to connect to the XBOX LIVE gaming service through a broadband connection.

The growth of broadband connections for accessing the Internet has been remarkable; currently, a substantial number of homes in this country have a broadband connection for accessing the Internet. However, most homes do not have wired Ethernet networks installed. Instead, wireless (WiFi) networks have become very popular as an alternative to wired Ethernet networks for interconnecting computers and other types of computing devices in a home and for providing access to the Internet. WiFi networks offer a relatively low cost and effective alternative to installing Ethernet wiring throughout a house when creating a residential LAN. In a wireless network, a wireless base station or router typically has a wide area network (WAN) port that is coupled to a DSL interface or cable modem and serves as an access station for one or more computing devices that wirelessly connect to the wireless base station. Certain types of computing devices, such as game consoles, set top boxes, laptop computers, and other computing devices only have an Ethernet port for connecting to the Internet and cannot access the base station wirelessly.

To address this problem, several companies have developed wireless bridges that include an Ethernet port coupled to a radio with a wireless transmitter and receiver. The Ethernet port on the wireless bridge permits an XBOX game console or other computing device to connect to the wireless bridge via a conventional Ethernet cable and communicate over the wireless network through the bridge. An XBOX game console can thus form a VPN tunnel with the XBOX LIVE gaming service over the wireless network. Similarly, other types of computing devices with an Ethernet port can connect to the Internet through a wireless network using the wireless bridge. Example of such wireless bridges include D-Link Corporation's Model 810™ and Linksys Corporation's Model WGA54G™.

Each wireless bridge vendor will typically employ different setup techniques. For example, if a wireless bridge is used with a computing device that runs a web browser program such as INTERNET EXPLORER™ or NETSCAPE™, it is relatively straightforward to configure the wireless bridge produced by some manufacturers by entering a default network address assigned to the wireless bridge by its manufacturer in the browser program and then interacting with an HTML web page having appropriate dialog boxes or text entry boxes for entry of the parameters needed to configure the wireless bridge. The configuration web page and other related web pages are typically embedded in the firmware of the wireless bridge, along with the software for accessing these web pages for configuring the bridge. Since configuration of the bridge is done using a conventional web browser program, almost any PC that can directly connect to the Ethernet port of the bridge can configure it. Alternatively, for some bridges produced by other vendors, a wizard set-up program supplied with the bridge is run on a PC that is connected by an Ethernet cable to the bridge to configure the bridge for the user's wireless network. Typically, the configuration will require providing a name for the network, an Internet Protocol (IP) address for the bridge (if the network does not use dynamic host configuration protocol (DHCP)), a gateway, a domain name server (DNS) IP address, an encryption keyword (if used), and other parameters and options. Once the bridge has been configured using the PC, the bridge can be moved and connected to any computing device that cannot itself readily be used to configure the bridge.

Many people are confused by the two step process that requires a bridge to be configured on a PC and then moved and connected to an XBOX™ game console or other computing device that is not readily usable to directly configure the bridge. Accordingly, what is needed is an approach that enables such a computing device to configure the bridge itself, without the need to first connect the bridge to a PC for the configuration before moving the bridge to the computing device for connecting the computing device to the wireless network.

One approach that might be used to address this problem is to provide a plurality of different configuration programs on the computing device for corresponding bridges produced by different manufacturers. The computing device might either automatically detect the model (and manufacturer) of the bridge coupled to the computing device or require that the user choose the appropriate configuration program by input of or selection of the model (and manufacturer) of the bridge being used from a list. However, other manufacturers may enter the market with such bridges. Maintaining an appropriate configuration for each of a plurality of different bridges that may change as new models are added or as changes are required to address firmware improvements is clearly impractical. Instead, what is needed is a single user interface for configuring bridges made by different manufacturers that is not affected by changes in the bridge firmware or the release of newer models. It should be possible to employ this single user interface to troubleshoot any problems arising in the configuration and to provide help in answering questions about the parameters and configuration options that are required. Although this approach might initially be implemented on a specific computing device such as the XBOX game console, it will be apparent that the same approach might be used for other types of computing devices, such as set top boxes, or computers without provision for adding a wireless PC card or other type of wireless station device.

SUMMARY OF THE INVENTION

To enable certain types of computing devices that do not have the ability to use a configuration web page or run a proprietary configuration wizard to directly setup a wireless bridge, the present invention employs a more general configuration interface program that will only operate with wireless bridges that are certified to operate with it. Any bridge that is not so certified will need to use a more conventional technique for configuring the bridge and selecting parameters that are required to connect a computing device to a wireless network through the bridge. The configuration interface program will only attempt to configure a bridge that is certified to be configured with the program.

More specifically, a first aspect of the present invention is directed to a bridge that includes a memory in which a stored authentication data and machine instructions. The authentication data are included to enable the bridge to be recognized as compatible for configuration through the computing device. A port adapted to couple the bridge to a computing device through a wire connector is included, as well as a radio that includes a wireless receiver and a wireless transmitter that are coupled to an antenna system. A processor is coupled to the memory, the port, and the radio and executes the machine instructions to carry out a plurality of functions. These functions include responding to a discover request from the computing device that is coupled to the bridge by returning an indication of an address of the bridge and configuration information for the bridge. The response also provides the authentication data to the computing device via the port. In response to a command received from the computing device, the processor sets properties of the bridge so as to enable the bridge to subsequently communicate data to and from the computing device over the wireless network. Data are then able to be communicated between the computing device and the wireless network via the bridge, once it has thus been properly configured.

The authentication data comprise a key that is provided to the computing device, but is not publicly available. Optionally, the authentication data may include a text string. A one-way hashing algorithm that uses the key is applied to a concatenation of a one-time variable, and the address of the bridge (and the text string—if used), producing a result that is communicated to the computing device in response to the discover request. Based upon the response, the computing device can confirm the compatibility of the bridge to be configured with the properties sent to the bridge by the computing device.

The processor then responds to a request received from the computing device to enumerate all available wireless networks by scanning for available wireless networks. The response returned to the computing device identifies an address for each access point of an available wireless network, as well as other parameters for each available network enumerated by scanning. A subsequent command received from the computing device sets the properties of the bridge as needed to enable the bridge to communicate with an available wireless network that was identified by scanning.

Another aspect of the present invention is directed to a method for automatically configuring a bridge to communicate over a wireless network, where the bridge is coupled through a wire connection to a computing device that does not have a web browser program for setting properties of the bridge. The method includes steps that generally implement the functions of the bridge and the computing device as described above.

Yet another aspect of the present invention is directed to a memory medium for carrying out the steps of the method, on the bridge, and on the computing device.

Still another aspect of the present invention is directed to a computing device for setting up a bridge to communicate over a wireless network. The computing device includes a memory in which machine instructions are stored, a network interface and port used for connecting through a wire lead to a bridge, and a processor that is coupled to the memory and the network interface. The processor executes the machine instructions to carry out a plurality of functions, including sending a discover request to a bridge that is connected to the network interface through the port, requesting information about the bridge. Using a key that is not publicly known, from the response to the discover request received from the bridge, the processor determines whether the bridge has included an indication that appropriate authentication data are stored on the bridge, thereby verifying whether the bridge is compatible with being set up to communicate over the wireless network by the computing device. If the bridge is compatible with being setup by the computing device, the processor sends a command to the bridge with properties selected to configure the bridge for communicating over the wireless network. And, if successful in configuring the bridge, the computing device is able to communicate over the wireless network through the bridge.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 4A:
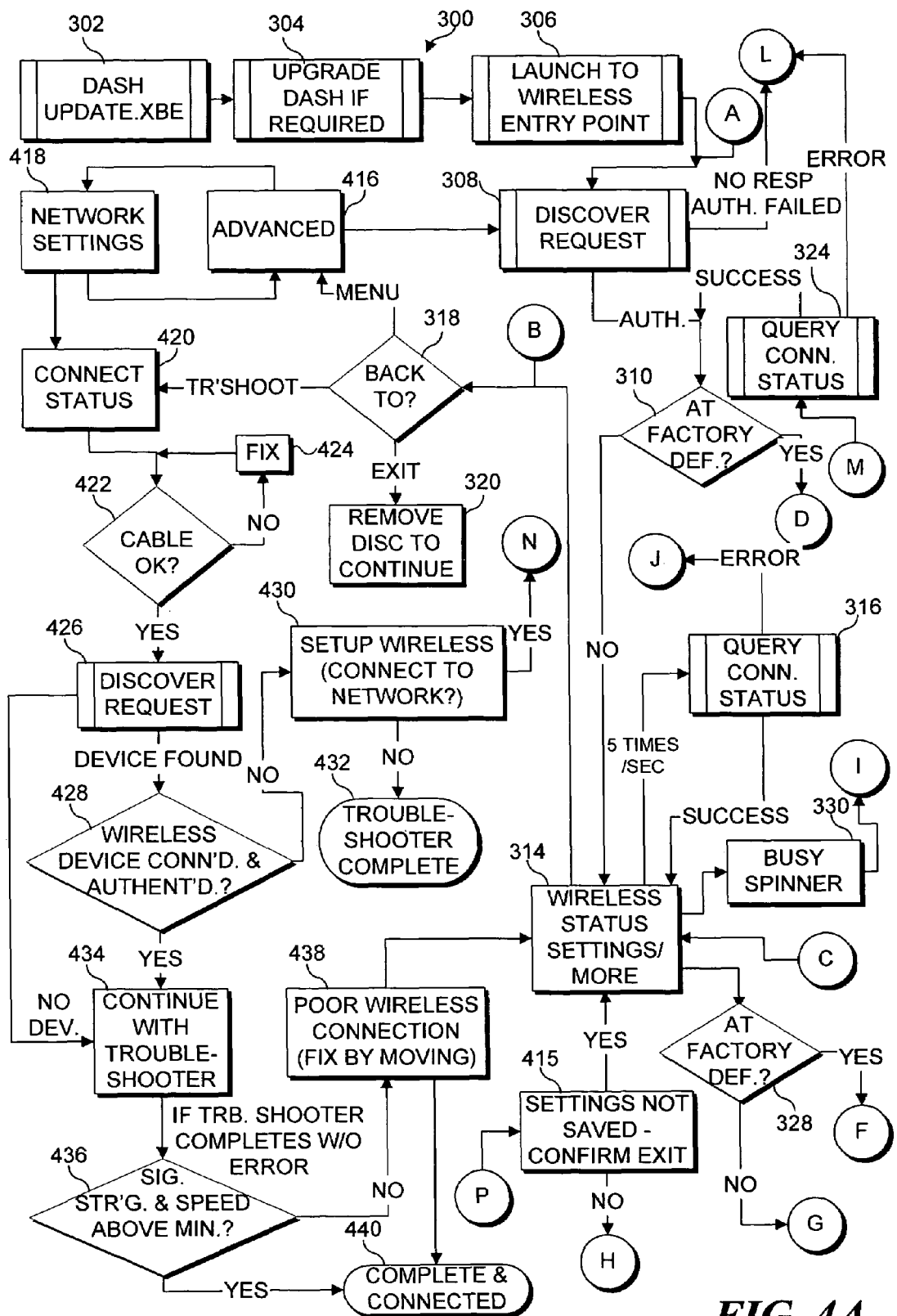
Figure 4B:
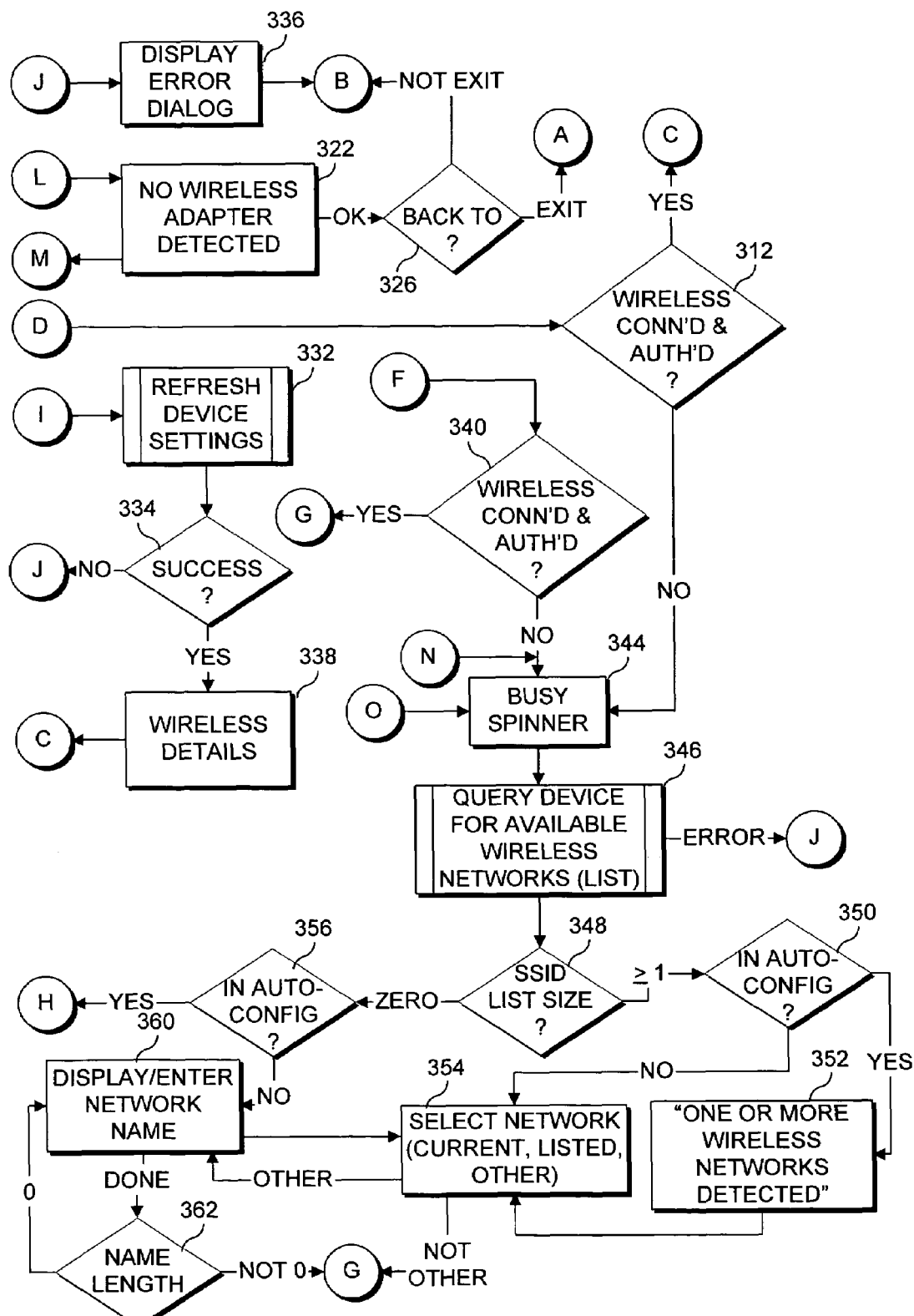
Figure 4C:
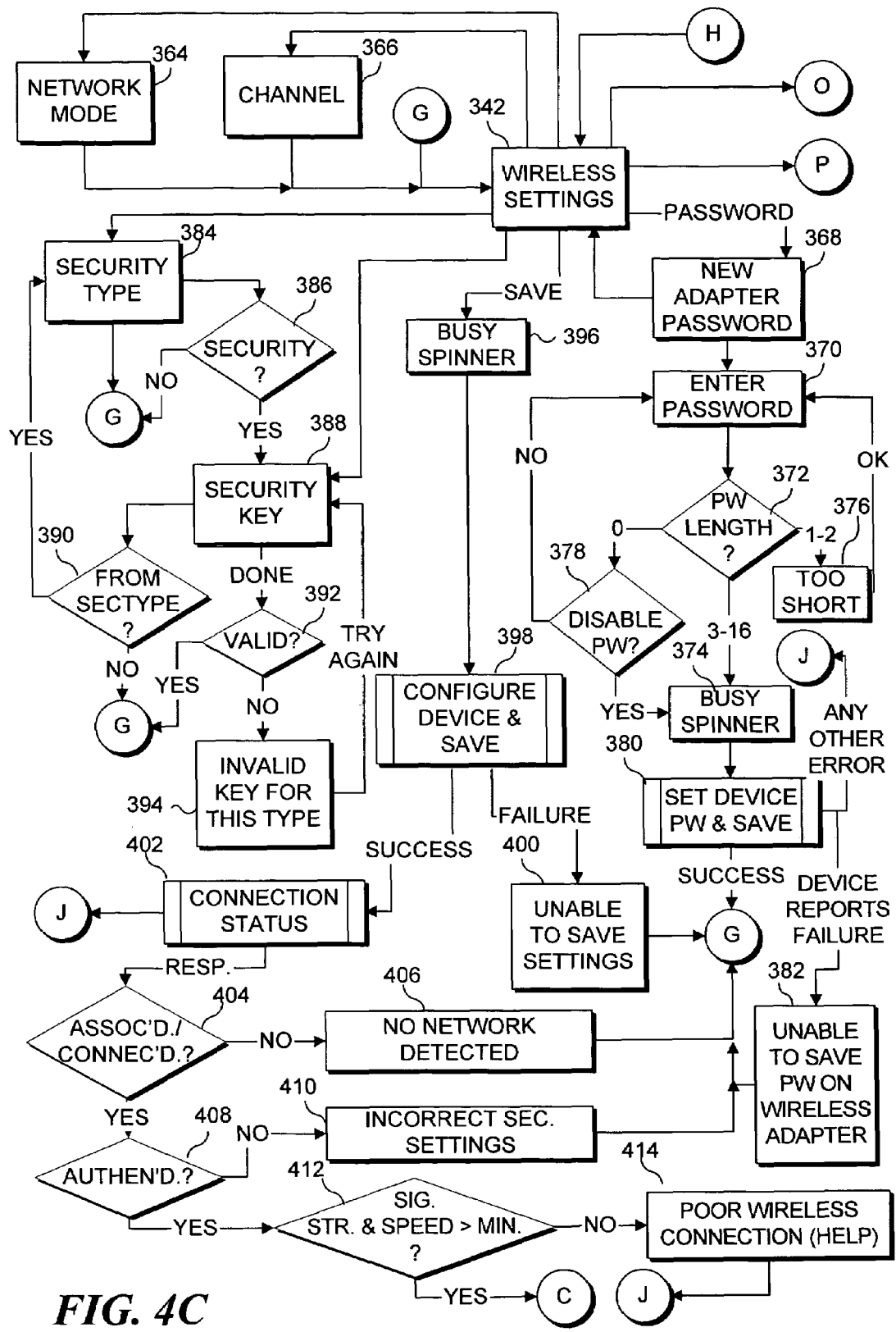
Figure 5:
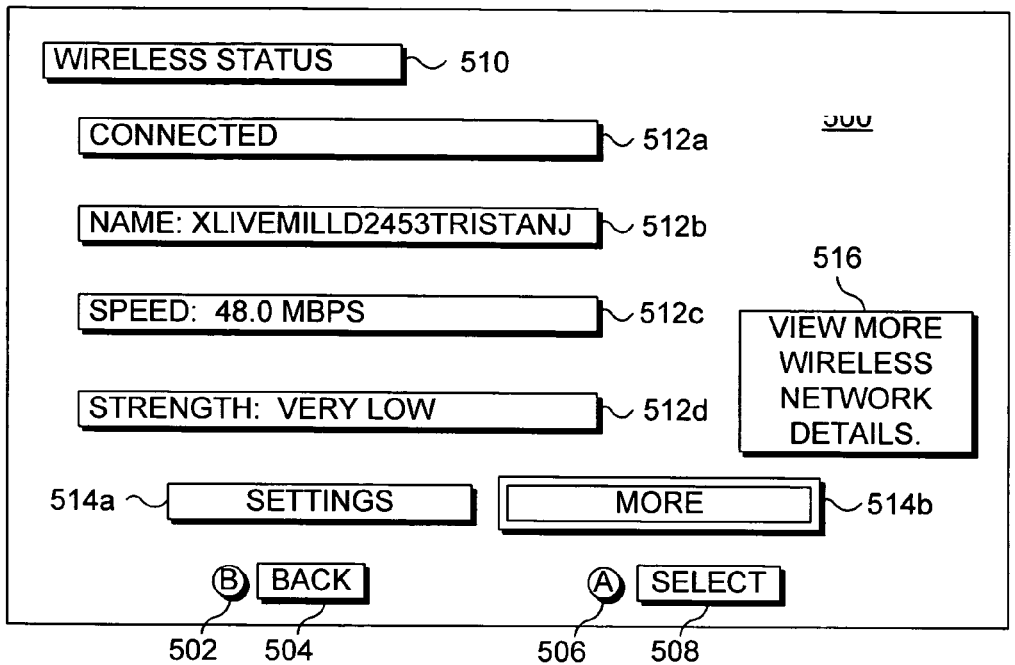
Figure 6:
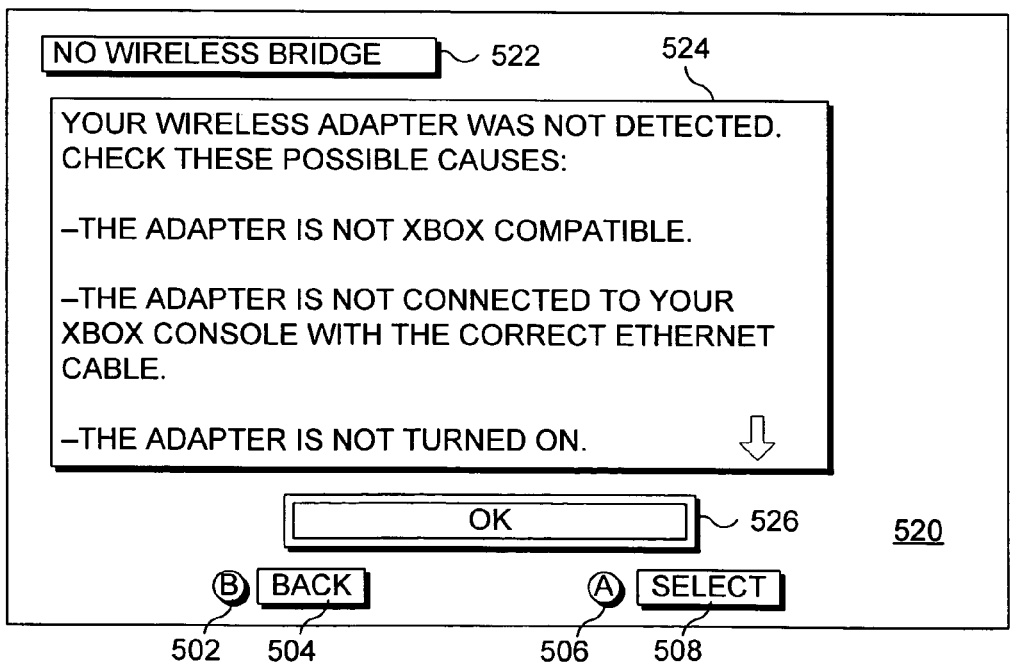
Figure 7:
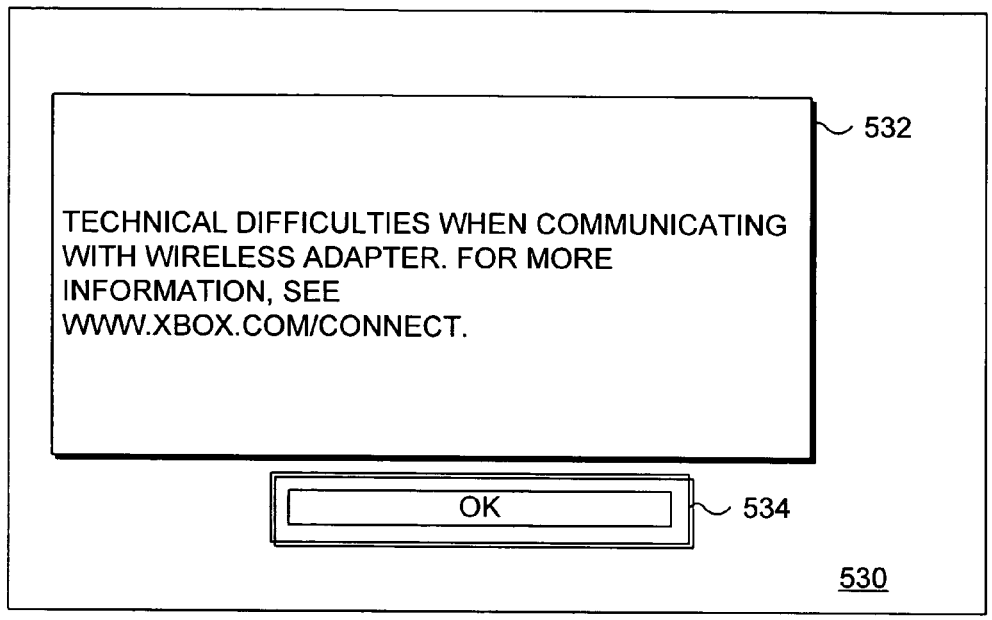
Figure 8:
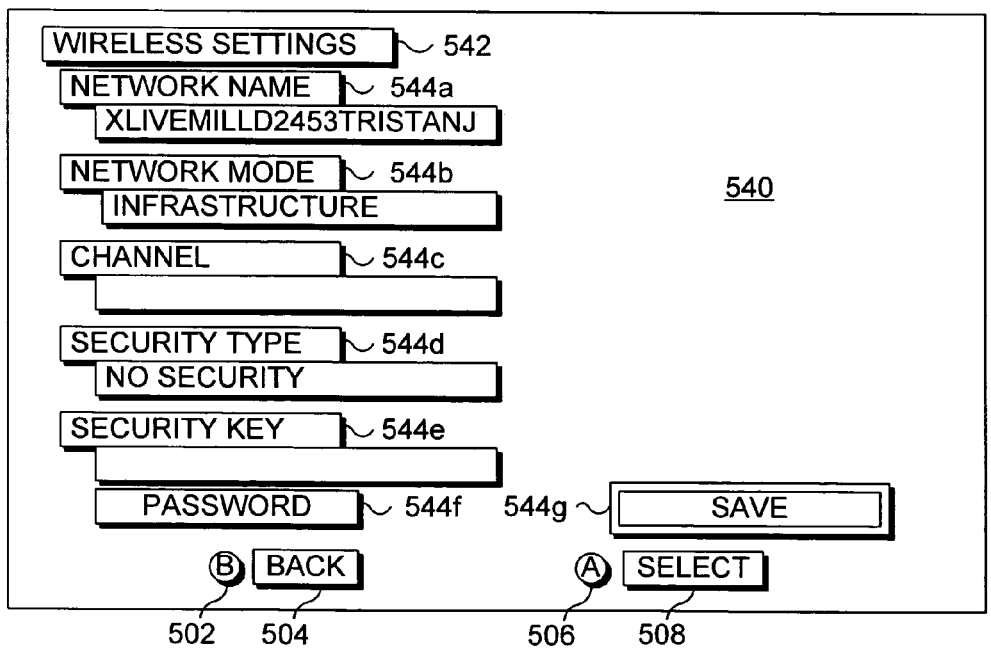
Figure 9:
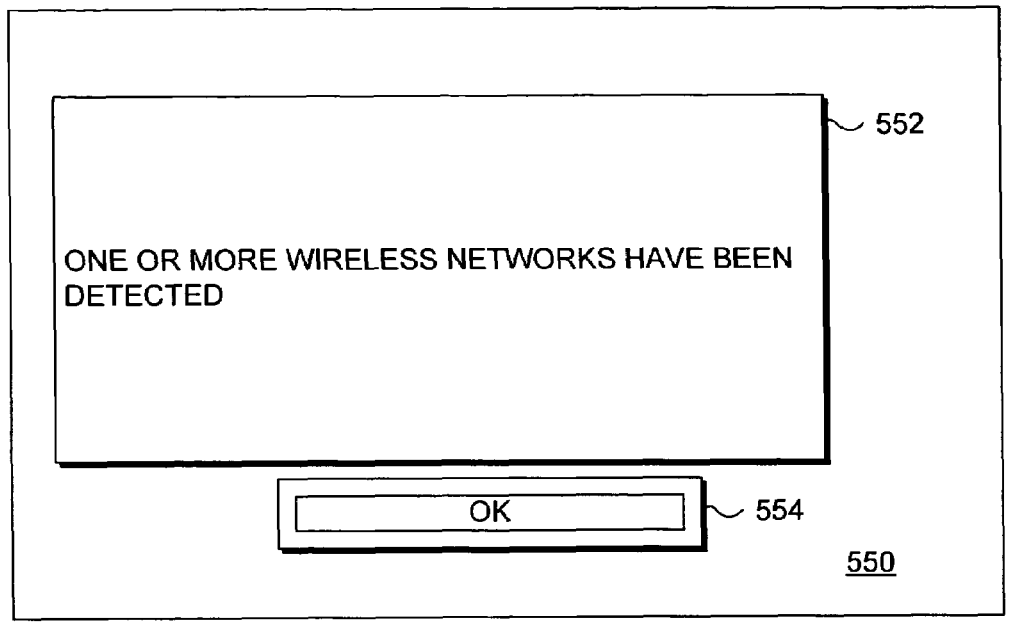
Figure 10:
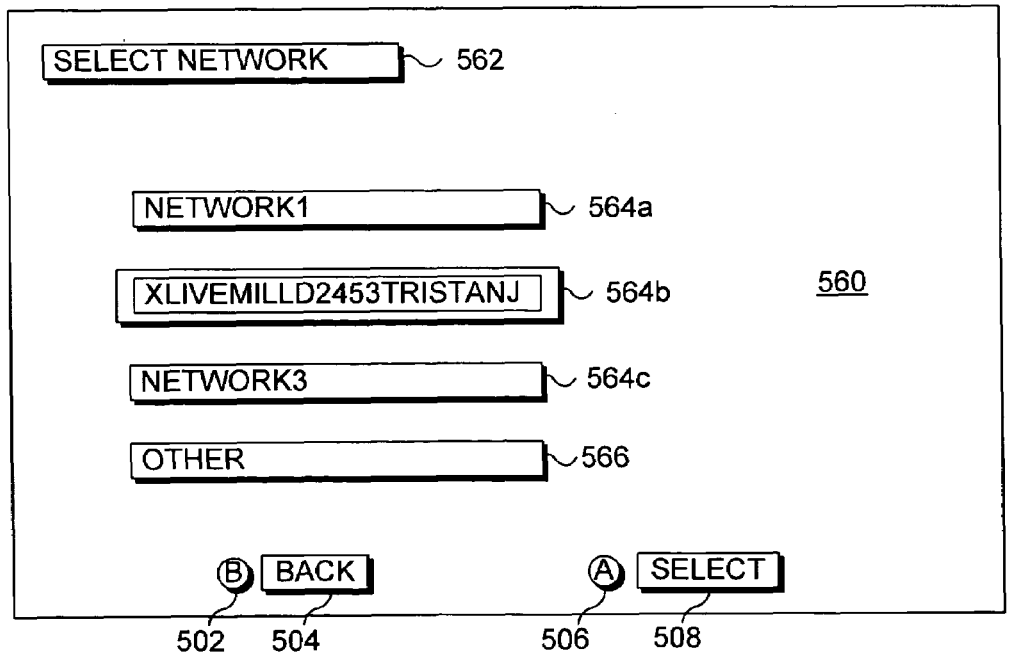
Figure 11:
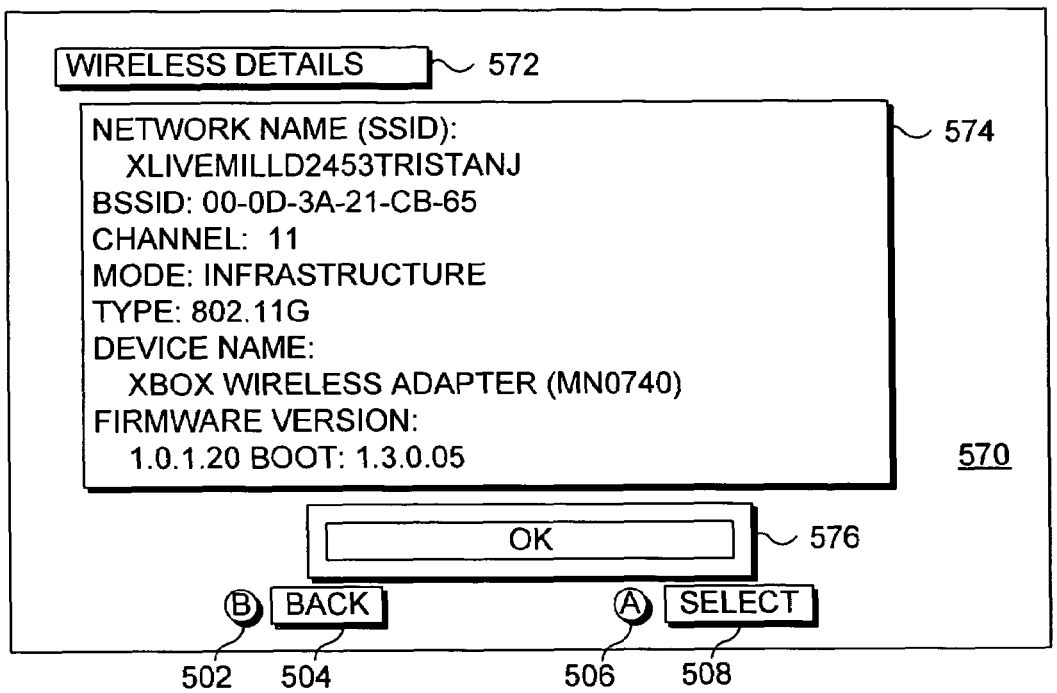
Figure 12:
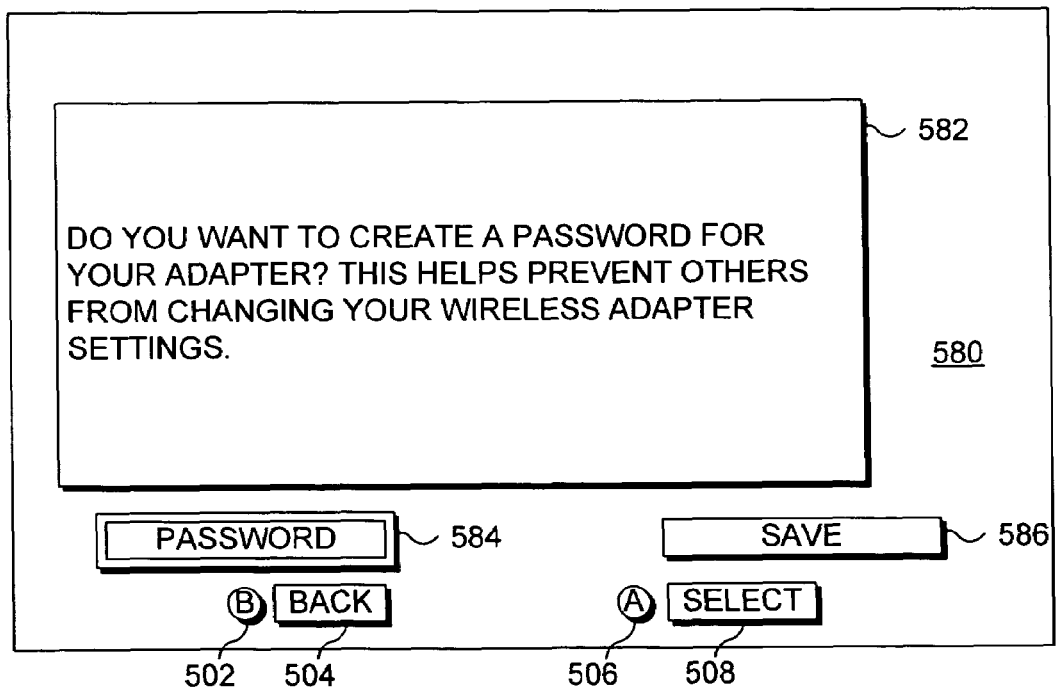
Figure 13:
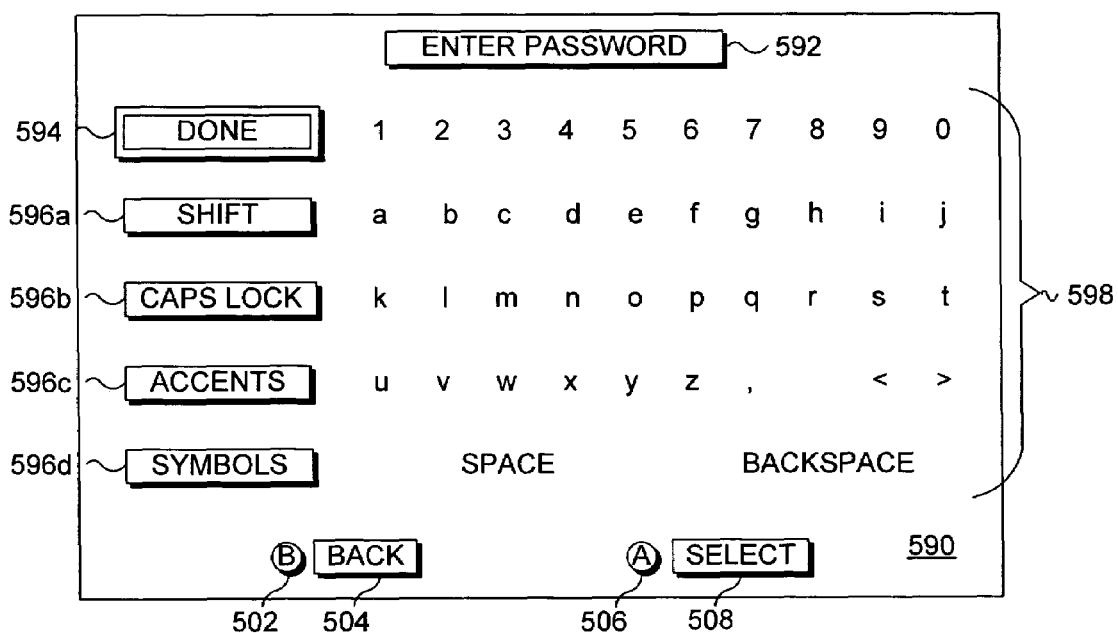

FIGS. 4A, 4B, and 4C comprise a flow chart showing the process used in a preferred embodiment of the present invention for configuring a device that does not have a web browser interface, but is able to authenticate its compatibility with being configured by software executed on the game console;

FIG. 5 is an illustration of an exemplary screen display showing the status of a wireless connection through a wireless bridge;

FIG. 6 is an illustration of an exemplary screen display showing information used to facilitate connection to a wireless access point;

FIG. 7 is an illustration of an exemplary screen display showing an error condition in the configuration of the wireless bridge;

FIG. 8 is an illustration of an exemplary screen display showing wireless bridge settings and available options;

FIG. 9 is an illustration of an exemplary screen display showing an indication of the wireless networks that have been detected by scanning;

FIG. 10 is an illustration of an exemplary screen display showing the options available to a user for selecting a network from among the one or more wireless networks that were detected;

FIG. 11 is an illustration of an exemplary screen display showing various wireless network connection parameters;

FIG. 12 is an illustration of an exemplary screen display showing options available to a user for setting a password; and FIG. 13 is an illustration of an exemplary screen display showing a virtual keyboard for data entry by a user for configuring the wireless bridge.

DESCRIPTION OF THE PREFERRED EMBODIMENT

Exemplary Game Console

Figure 1:
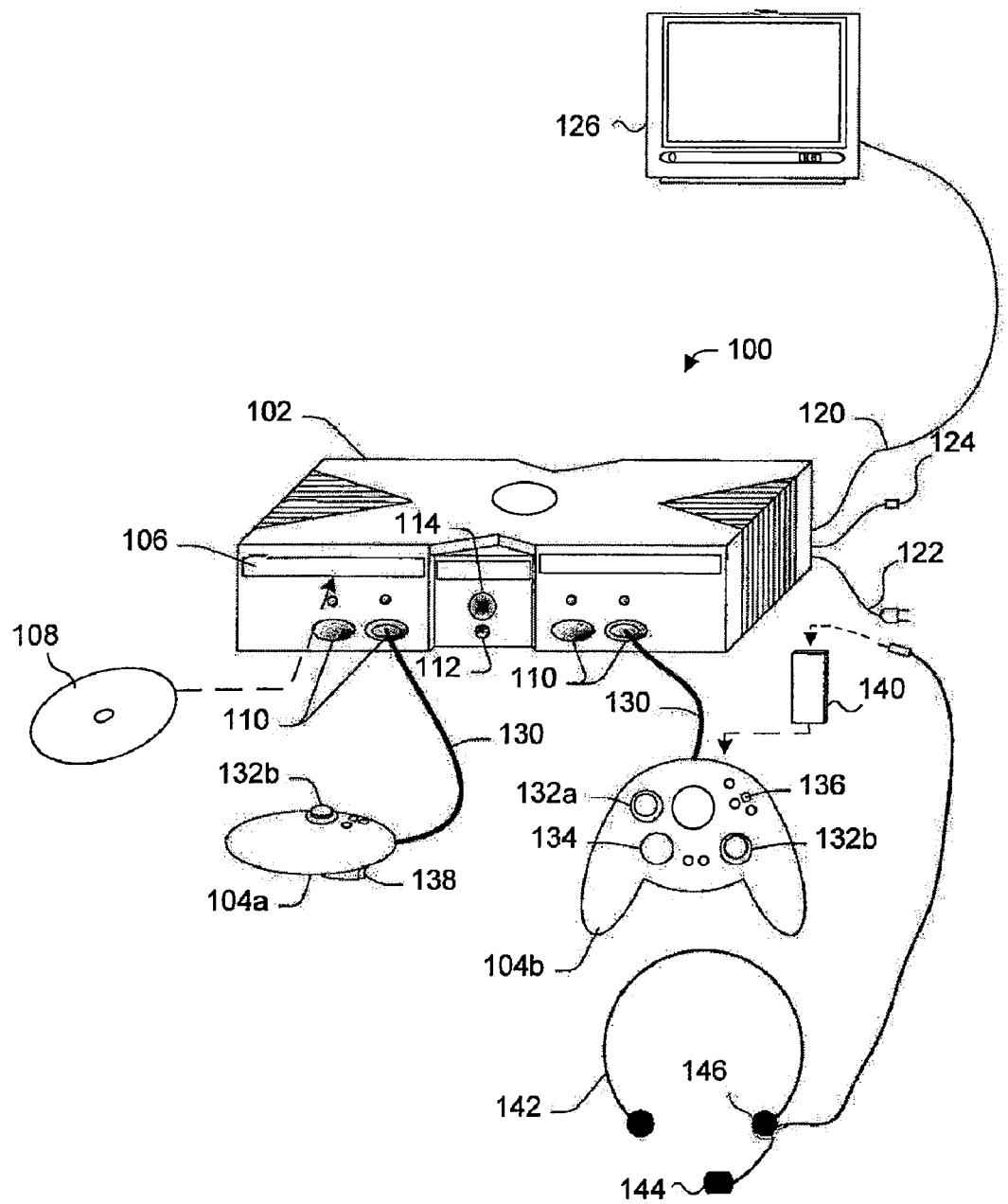
FIG. 1 is an isometric view of a game console that may use the present invention to configure a wireless bridge.

As shown in FIG. 1, an exemplary electronic gaming system 100 includes a game console 102 and support for up to four user input devices, such as controllers 104a and 104b. Game console 102 is equipped with an internal hard disk drive (not shown in this Figure) and a portable media drive 106 that supports various forms of portable optical storage media, as represented by an optical storage disc 108. Examples of suitable portable storage media include DVD discs and CD-ROM discs. In this gaming system, game programs are preferably distributed for use with the game console on DVD discs, but it is also contemplated that other storage media might instead be used, or that games and other programs can be downloaded from a gaming site over the Internet (or other network).

On a front face of game console 102 are four connectors 110 that are provided for electrically connecting to the controllers. It is contemplated that other types of connectors or wireless connections might alternatively be employed. A power button 112 and a disc tray eject button 114 are also disposed on the front face of game console 102. Power button 112 controls application of electrical power to the game console, and eject button 114 alternately opens and closes a tray (not shown) of portable media drive 106 to enable insertion and extraction of storage disc 108 so that the digital data on it can be read and loaded into memory or stored on the hard drive for use by the game console.

Game console 102 connects to a television or other display monitor or screen 126 via audio/visual (A/V) interface cable 120. A power cable plug 122 conveys electrical power to the game console when connected to a conventional alternating current line source (not shown). Game console 102 may be further provided with a data connector 124 to transfer data through an Ethernet connection to a network and/or through a broadband connection to the Internet. Alternatively, it is contemplated that a modem (not shown) may be employed to transfer data to a network and/or the Internet. As yet a further alternative, the game console can be directly linked to another game console via an Ethernet crossover cable (not shown).

Each controller 104a and 104b is coupled to game console 102 via a lead (or in a contemplated embodiment, alternatively, through a wireless link). In the illustrated implementation, the controllers are Universal Serial Bus (USB) compatible and are connected to game console 102 via USB cables 130. Game console 102 may be equipped with any of a wide variety of user devices for interacting with and controlling the game software. As illustrated in FIG. 1, each controller 104a and 104b is equipped with two thumb sticks 132a and 132b, a D-pad 134, buttons 136, and two triggers 138. These controllers are merely representative, and other gaming input and control mechanisms may be substituted for or used, in addition to those shown in FIG. 1, for controlling game console 102.

Removable function units or modules can optionally be inserted into controllers 104 to provide additional functionality. For example, a portable memory unit (not shown) enables users to store game parameters and port them for play on another game console by inserting the portable memory unit into a controller on the other console. Other removable function units are available for use with the controller. For example, a removable function unit comprising a voice communicator module 140 is employed to enable a user to verbally communicate with other users locally and/or over a network. Connected to voice communicator module 140 is a headset 142, which preferably includes a boom microphone 144 or other type of audio sensor that produces an input signal in response to incident sound, and a headphone 146 or other type of audio transducer for producing audible sound in response to an output signal from the game console. In another embodiment that is contemplated (not shown), the voice communicator capability is included as an integral part of a controller (not shown) that is generally like controllers 104a and 104b in other respects. The controllers illustrated in FIG. 1 are configured to accommodate two removable function units or modules, although more or fewer than two modules may instead be employed.

Gaming system 100 is of course capable of playing games, but can also play music and videos on CDs and DVDs. It is contemplated that other functions can be implemented by the game controller using digital data stored on the hard disk drive or read from optical storage disc 108 in drive 106, from an online source, or from a function unit or module.

As supplied, game console 102 is not intended to be capable of browsing the Internet or connecting to web addresses that display web pages in a browser program. Instead, the game console can only connect to a dedicated gaming service over the Internet that facilitates multiplayer games played by subscribers to the service who connect through game consoles that are registered with the gaming service. Each connection over the Internet is through a VPN tunnel, so that the communications between the game console and the gaming service are secure. The game console is not currently provided with a conventional keyboard, so that entry of text messages or other text input is possible only by selecting alphanumeric characters from a virtual keyboard display (shown in FIG. 13) using one of the controllers. The game consoles do not have direct communication with parties who are outside of the environment that is provided by the gaming service for playing multiplayer games. Similarly, anyone who is not connected with a game console in the gaming environment cannot have direct communication over the Internet with those who are connected to the gaming service. It is the lack of a web page browser program on the game console that precludes using a configuration web page that might be embedded in a conventional wireless bridge to setup the parameters of the wireless bridge to communicate over a wireless network.

Wireless Bridge

Figure 2:
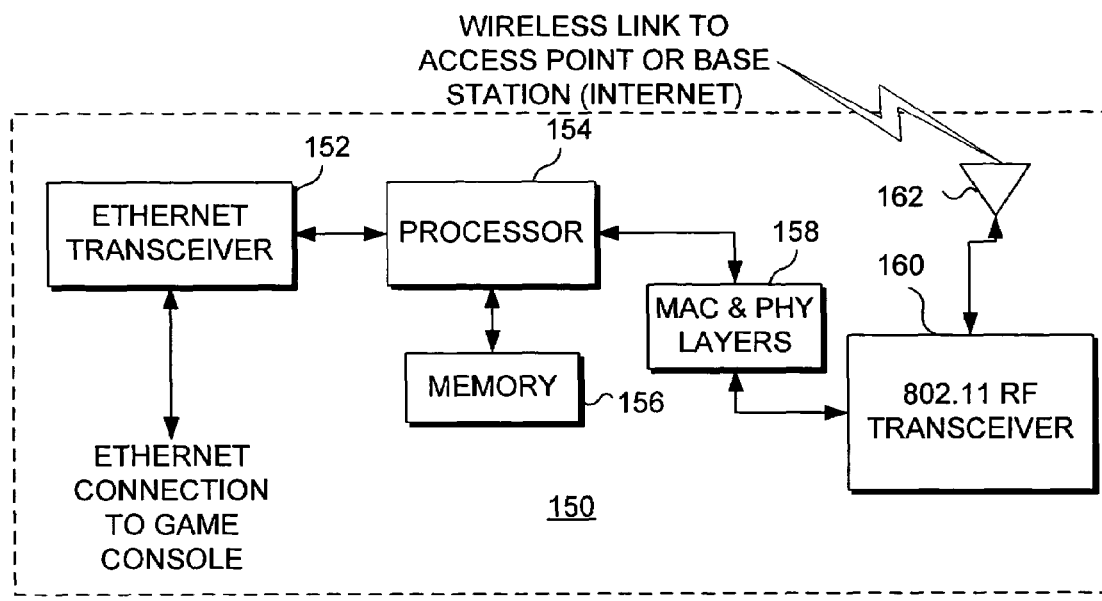
FIG. 2 is a block diagram illustrating the components of a wireless bridge that is compatible with being configured or setup by the game console, in accord with present invention.

FIG. 2 illustrates a block diagram that includes functional components of an XBOX™ compatible wireless bridge 150. The wireless bridge includes an Ethernet transceiver 152 that transmits and receives data to and from the game console via an Ethernet wire connection. Data received from the XBOX™ game console are sent to a processor 154 that acts on the incoming data according to instructions read from a memory 156. The memory also stores authentication data that enables the adapter to be recognized as compatible for configuration through the computing device. Dependent on the incoming data, the processor also writes data to the memory. The processor sends data to a block 158 comprising Medium Access Control (MAC) and Physical (PHY) Layers. The MAC layer controls how a computing device on a network gains access to data and permission to transmit it. The Physical Layer conveys the bit stream to an 802.11 radio frequency (RF) transceiver 160 to drive antenna(e) 162 that propagate(s) radio waves to a wireless access point or other wireless link. Data exchange between the functional components in the wireless bridge is bi-directional so that data that are received through the antenna(e) are processed and conveyed to the Ethernet connection of the game console.

Gaming Environment

Figure 3:
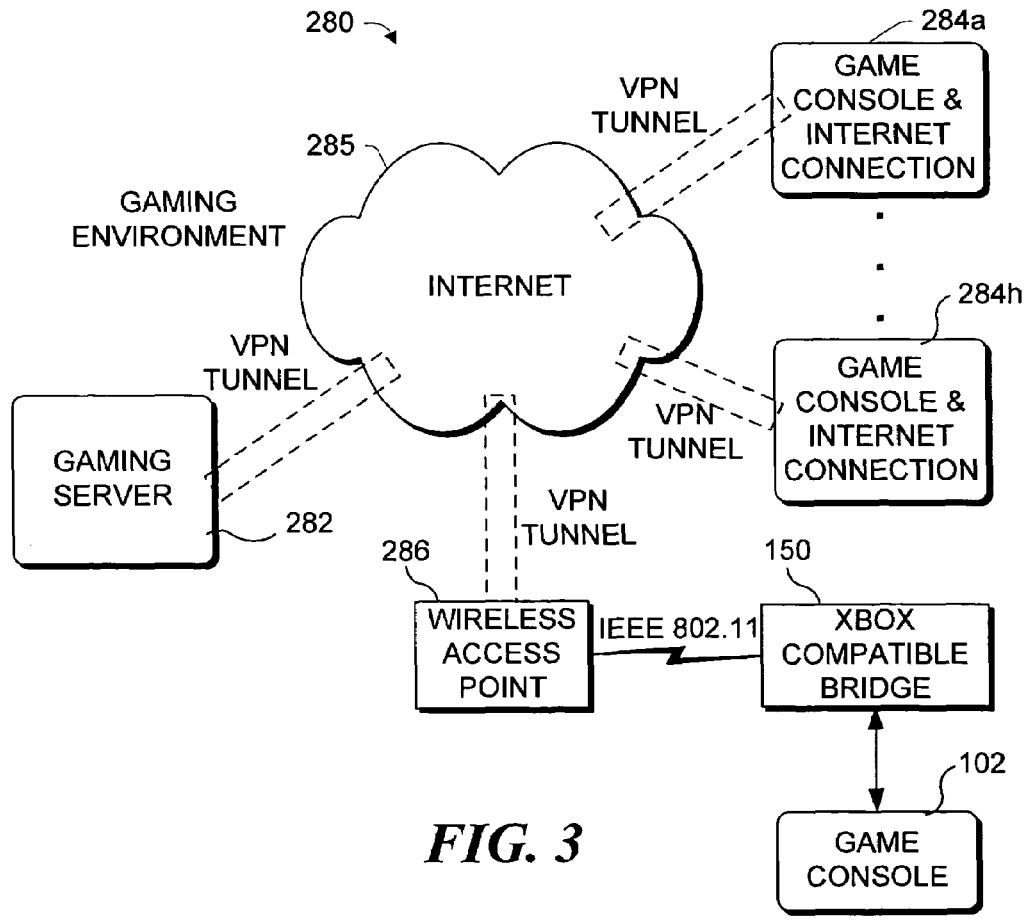
FIG. 3 is a schematic diagram illustrating how a plurality of game consoles are connected in communication over the Internet, through a gaming service implemented by a gaming server.

FIG. 3 illustrates different aspects of the gaming environment. In FIG. 3, a schematic diagram 280 shows that the online gaming environment comprises a plurality of game consoles and Internet connections 284a-284h, which are connected to a gaming server 282. Of particular note is game console 102 that is connected to XBOX™ compatible wireless bridge 150. The wireless bridge transmits wireless IEEE 802.11 data packets to and receives IEEE 802.11 data packets from a wireless access point (or base station) 286. Data packets are conveyed between the gaming server and the game consoles through VPN tunnels, over Internet 285. Each of game consoles and Internet connections 284a-284h is thus connected in secure communication with gaming server 282, which may comprise a single server or, alternatively and more likely, will include a plurality of servers that are coupled together to carry out specific functions required for the gaming service. Use of the VPN tunnel insures a secure communication link between each game console and the gaming service. The secure gaming environment of FIG. 3 does not provide any option for connecting a game console to any other device and only permits communication between game consoles that are connected to the gaming service to enable the game consoles to participate in multiplayer games. Although a game console can conduct certain administrative functions such as subscribing, selecting passwords, and indicating other players with whom a person using the game console wants to participate in a multiplayer game, the game consoles are constrained from communicating over the Internet outside the gaming environment defined by FIG. 3. Thus, a game console of this type cannot connect with an arbitrary web page using an HTML web browser, as is possible on a PC or other general computing device that has an Internet connection and is provided with a web browser. In addition, it would be impractical to attempt to provide configuration programs for each of a plurality of different models of wireless bridges from different manufacturers, since each would require a different configuration program.

Device Configuration

FIGS. 4A, 4B, and 4C illustrate, in an exemplary manner, the process for configuring an XBOX™ compatible wireless bridge that does not have a web browser interface, without using a model/manufacturer specific configuration program that is executed on the game console. The Ethernet port of the wireless bridge is connected by a conventional Ethernet cable to the Ethernet port of the XBOX™ game console.

A recent update to the "Dashboard" program is employed to configure a compatible wireless bridge. The Dashboard is executed each time the XBOX™ game console is rebooted with no game media in the DVD-ROM drive, or in response to certain other conditions. The Dashboard program provides the user interface for the game console when the user is not playing a game.

As indicated in a flow chart 300, the wireless bridge may be set up by following the logic that starts with a step 302. In this step, a Dashboard update program executes upon starting the XBOX™ game console with an appropriate CD installed in the optical media reader drive. This program upgrades the Dashboard running on the XBOX so that it is able to configure a compatible wireless bridge. Alternatively, while connected to the XBOX LIVE™ gaming service using, for example, a wire Ethernet connection, the Dashboard update will automatically be downloaded and installed. A step 304 upgrades the Dashboard, if the Dashboard has not already been updated by other means, as noted above. The process proceeds to a step 306, which launches the Dashboard to a wireless entry point and continues with a step 308. In step 308, the logic provides for the XBOX game console to send a discover request to the wireless bridge. A discover request is a transmission to all entries on the Ethernet segment. The discover request includes a 16 byte nonce, which might be a current time or some other quasi random variable. This step causes the wireless bridge to authenticate its XBOX™ compatibility by responding with secure, encoded data that can only be provided by devices specifically designed to interface with and be configured by the XBOX™ game console. More specifically, the wireless bridge concatenates components, including the nonce received from the game console, a unique MAC address assigned to the wireless bridge when it was manufactured, and in a preferred embodiment, a predefined alphanumeric (text) string. The text string is not required, but provides an additional security measure, since unauthorized duplication of the text string may constitute a copyright infringement. Next, the wireless bridge applies a Keyed-Hash Message Authentication Code ($HMAC_{key}$) to the three (or two) concatenated components, producing a 20 byte digest that is returned to the XBOX™ game console over the Ethernet cable. The $HMAC_{key}$ algorithm is described in Federal Information Processing Standards Publication 198, published Mar. 6, 2002, which notes that HMACs typically have two functionally distinct parameters, including a message input (i.e., the concatenation of the three components) and a secret key.

The digest is received by the game console, along with the MAC of the wireless bridge. By repeating the concatenation of the three (or two) components and applying the same key using the HMAC algorithm a result is obtained that is compared with the digest received from the wireless bridge by the XBOX™ game console. The wireless bridge therefore proves that it is compatible with being configured by the game console if the digest and the corresponding result produced by the game console match.

If the wireless bridge thus successfully authenticates its XBOX compatibility, a decision step 310 determines if the wireless bridge is at the factory default settings. If the wireless bridge is set at the factory default settings, the logic continues through connector "D" on FIG. 4B to a decision step 312, which determines if the wireless bridge is connected and authenticated? If so, the logic continues through connector "C" on FIG. 4A to a step 314, which displays the wireless link status. This step displays the connection status (i.e., connected or not), the network name (i.e., Wireless SSID), the connection data rate, and the signal strength for received wireless data. The user is given the option to change the settings, view more network details, or exit this display screen (i.e., by pressing the back button "B" on the game console controller). While at step 314, a step 316 queries the connection status five times per second and, so long as the query indicates that the wireless bridge is connected, returns to step 314 to refresh the Wireless Status display with the current information noted above. The status display of signal strength enables a user to move the wireless bridge about within a room, while viewing the data on the display to determine an ideal location for the wireless bridge that provides a maximum (or at least an acceptable) signal strength for communicating with the wireless network. From step 314, if the user presses the "back" or "B" button on the controller, a step 318 evaluates the Back To variable, which determines how the user originally navigated to the wireless bridge configuration user interface. If the user arrived in the wireless configuration from the "advanced" network settings menu, then the user will be returned to the advanced network menu. If the user arrived in the wireless configuration user interface from the network troubleshooter, then the user will be returned to the network troubleshooter. If the user exits the configuration program after successfully setting up the compatible wireless bridge, the logic will advise the user to remove the disc to continue, in a step 320. After removing the disc, the system will reboot and will communicate with the gaming environment via the wireless bridge, which is now properly configured to communicate over the wireless network.

Depending on the wireless environment, specific wireless bridge, and the user's responses or input, other logic will be followed, as explained below.

Authentication Failure

Referring to step 308, if no valid response is received from the wireless bridge in the attempt to authenticate it as an XBOX™ compatible wireless bridge, the logic continues through connector "L" on FIG. 4B to a step 322. In this step, the display indicates that a wireless bridge was not detected and an associated help screen suggests several possible causes that should be examined before continuing. While at step 322, the logic continues through connector "M" on FIG. 4A to a step 324, which continuously queries the connection status to determine if any of the suggested steps that have been carried out by the user have corrected the problem. If the wireless bridge successfully responds with the proper authentication result, the logic continues to step 310; otherwise, the error loops back through connector "L" on FIG. 4B to step 322. While at step 322, the user may choose to return to the wireless entry point or to quit the wireless setup. Pressing an appropriate button on the controller will transfer the logic to a decision step 326 that evaluates which option the Back To variable should follow. If the "A" button is pressed, the state of the Back To variable is to "exit" and the logic continues through connector "A" on FIG. 4A, returning to the wireless entry point. If the "B" button is pressed, the state of the Back To variable is "not exit" and the logic continues through connector "B" on FIG. 4A to decision step 318. If the wireless bridge is not at factory settings as determined by step 310, the logic continues at step 314 to display the connection wireless status. If the wireless bridge is at factory settings, the logic continues through connector "D" on FIG. 4B to decision step 312.

If the wireless bridge is connected and authenticated at decision step 312, the logic continues through connector "C" on FIG. 4A to step 314. Otherwise, an available wireless network has not yet been identified, and in a step 344, the busy spinner is displayed to the user while the game console requests that the wireless bridge transmit a wireless query that will identify available wireless networks, in a step 346. In this step, the wireless bridge generates a list with one Service Set Identifier (SSID) for each Basic Service Set Identifier (BSSID) detected, operating in either ad hoc or infrastructure mode. Any error in this step leads to a step 336, which displays an error dialog and is discussed below. A decision step 348 determines a size of the SSID list (i.e., the number of entries or wireless networks that were identified). If the number of entries in the list is greater than or equal to one, a decision step 350 determines if the wireless bridge is set to an auto configure mode, and if so, a step 352 displays an indication that "one or more wireless networks have been detected." Thereafter, or if the response to decision step 350 is negative, the logic proceeds to a step 354, which directs the user to select the network to which the wireless bridge is to connect. The user will choose one of the listed items, which are presented starting with the most powerful beacon for the "Current" SSID (if any network was previously selected), followed by the SSIDs of any other networks in order of signal strength (from higher to lower), followed by an entry "Other." The first entry in the list is the default, if no other selection is made by the user.

If the user selects "Other" from the list, the logic continues with a step 360, which displays a current network name or enables a user to employ a virtual keyboard to enter the network name. If the user selects a controller key to indicate that the network name has been entered, a decision step 362 determines if the length of the network name is zero and if so, loops back to step 360 until at least one character has been entered. Alternatively, the user may go back to step 354 to select a different option from the list, which enables a user to indicate a network that is not broadcasting its SSID for security or other reasons, so that the network is not included in the list of networks returned from the scan.

Returning to decision step 348, if the size of the list is equal to zero entries, the logic proceeds to a decision step 356, which again determines if the wireless bridge is in the auto configuration mode. If not, the logic continues with step 360. Otherwise, the logic continues through connector "H" to a step 342 in FIG. 4C, at which step the wireless bridge settings or parameters are displayed, as discussed below.

In step 354 on FIG. 4B, if the user either selects any entry in the list beside "Other," or if the network name length is not equal to zero, the logic continues through connector "G" to step 342 in FIG. 4C.

Wireless Status

While at step 314, step 316 queries the connection status once per second. If step 316 detects an error, the logic continues through connector "J" at the top of FIG. 4B to a step 336. Step 336 displays an error dialog, which informs the user that the XBOX console has had technical difficulties communicating with the wireless bridge and directs the user to seek additional help at the XBOX LIVE™ web site (e.g., accessed using a PC). When the user responds by pressing the "A" button to indicate "OK," the process continues through connector "B" on FIG. 4A to decision step 318, which determines that the process should be exited, leading to step 320.

From step 314, which displays the wireless status, if the user selects an option "settings" to change the settings, a decision step 328 determines if the wireless bridge currently is using the factory default settings. If so, the logic continues through connector "F" on FIG. 4B to a decision step 340, which determines if the wireless bridge is connected and authenticated. If so, the logic continues through connector "G" on FIG. 4C to step 342, which displays the wireless bridge settings. Referring back to decision step 328, if the wireless bridge is not set to the factory default settings, the logic continues through connector "G" on FIG. 4C to step 342.

Referring back to decision step 340, if the wireless bridge is not connected or authenticated, the logic continues with step 344 while querying for available wireless networks in step 346, as described above.

Referring to back to step 314 on FIG. 4A, if the user selects the option "More," to view more network details, a step 330 displays a busy spinner and continues through connector "I" on FIG. 4B to a step 332, which refreshes the wireless bridge settings. Decision step 334 determines whether the settings were properly refreshed. If not, the logic continues through connector "J" at the top of FIG. 4B to step 336, which displays an error dialog, as discussed above.

If the settings were properly refreshed in decision step 334, a step 338 display wireless details to the user on a screen, showing the network name associated with the SSID, the BSSID, channel, mode, type, wireless bridge name, and firmware version. When the user pushes the "A" or "OK" button on the controller, the logic continues through connector "C" on FIG. 4A to step 314, which has already been described.

Wireless Settings

From the display of wireless setting in step 342, the user may selectively modify the network name, network mode, channel, security type, security key, password, or may save the settings, or may exit the display.

Network Name

If the user selects network name from Wireless Settings, the logic continues through connector "O" on FIG. 4B and displays the busy spinner in step 344, while conducting the query of step 346 by scanning for available wireless networks to generate a list, as described above. The user can then selectively change to a different wireless network in the list.

Network Mode

If the user selects network mode from the wireless settings, a step 364 displays network mode information to the user. The user may move the cursor to the desired mode (i.e., infrastructure or ad hoc) and then press the "A" button to make the selection, or can exit this screen by pressing the "B" button. In either case, logic continues at step 342.

Channel

While operating in ad hoc mode, if the user selects channel from the wireless settings, a step 366 displays channel information to the user. Note that this option is not available when operating in infrastructure mode. The user may move the cursor to the desired channel and then press the "A" button to make the selection, or may exit the screen by pressing the "B" button. In either case, logic continues at step 342.

Password

If the user selects password from the wireless settings, a step 368 displays the options of setting or changing a password on the wireless bridge. If the user chooses not to set or change the password, the logic returns to step 342, otherwise a step 370 displays a virtual keyboard to the user to enable entry of the new (or changed) password. After a password has been entered, the length of the password is evaluated in a decision step 372. If the password is 3 to 16 characters, a step 374 displays a busy spinner and then a step 380 gives the user the option to save the password that was entered. If the password is 1 or 2 characters, a step 376 indicates that the password is too short and must either be 0 characters (empty) to disable the password, or 3 to 16 characters long. When the user responds to this message by pressing "A" for "OK" on the controller, the logic returns to step 370 where the user must enter the password of the required length or leave the password blank (zero characters). If the password is zero characters, a decision step 378 determines if the user wants to disable the password. A negative response directs the logic back to step 370 where the user must enter a non-zero password of 3-16 characters, whereas a positive response directs the logic to step 374. The process continues from step 374 to step 380, which enables the user to save the wireless bridge password. If the password has been successfully saved, the logic continues through connector "G" at the top of FIG. 4C with step 342. However, if the wireless bridge reports a failure, a step 382 indicates that the wireless bridge was unable to save the password and directs the user to other sources of information to correct the problem. When the user presses the "A" button, the logic continues through connector "G" on at the top of FIG. 4C to step 342, which displays the wireless settings. If there are any other errors, the logic continues through connector "J" at the top of FIG. 4B to step 336, which displays the error dialog, as discussed above.

Security

If the user selects security type from the wireless settings, a step 384 displays a screen to the user from which the user may select a desired level of security (i.e., 64 bit Wired Equivalent Privacy (WEP), 128 bit WEP, WiFi Protected Access (WPA), or no security at all). The selection is checked to determine if a security level has been selected in a decision step 386 and if no security was selected, the logic continues through connector "G" at the top of FIG. 4C with step 342.

If the user has selected some level of security, decision step 386 proceeds with a step 388, which displays a virtual keyboard to the user for entering a security key of the appropriate length or type, based upon the selection that was made.

If the user chose to exit the virtual keyboard without completing entry of the security key, a decision step 390 determines whether the exit was from the step of entering a security key. If the entry to step 388 came via step 384, the logic returns to step 384; otherwise, the logic continues through connector "G" at the top of FIG. 4C, returning to step 342.

If the user completes entry of the security key in step 388, a decision step 392 determines if the key is valid (for 64 bit WEP, either five ASCII characters or 10 hex digits must be entered, while for a 128 bit WEP, either 13 ASCII characters or 26 hex digits must be entered, while a WPA requires 64 hex digits or a pass phrase of from 8 to 63 ASCII characters to be entered). If the entry is valid, the logic continues through connector "G" at the top of FIG. 4C, with step 342. If the key that was entered is not valid, a step 394 indicates that an improper key has been entered for the type of security selected and prompts the user to try entering the key again, before returning to step 388.

Save

If the user selects save at step 342, a step 396 displays a busy spinner and the process proceeds to a step 398, which configures the wireless bridge with any parameter that was modified by the user and saves the modified configuration. If the save operation was not successful, a step 400 indicates that the wireless bridge was unable to save the settings and directs the user to other sources of information to correct the problem. When the user presses the "A" button for "OK," the logic continues through connector "G" at the top of FIG. 4C, with step 342. If the save operation was successful, a step 402 determines the current status of the wireless connection. If there is no response, the logic continues through connector "J" at the top of FIG. 4C, with step 336, which has been discussed above. If the wireless bridge responds, a decision step 404 determines if the wireless bridge is associated/connected to a wireless network. If not, a step 406 displays an indication that no network was detected and displays information that may be helpful to correct the problem. Pressing the "A" button on the controller directs the logic to continue through connector "G" at the top of FIG. 4C, with step 342. If decision step 404 determined that the wireless bridge was associated/connected with a wireless network, a decision step 408 determines if the wireless bridge is authenticated, i.e., if it has the correct security settings. If not, a step 410 indicates that the incorrect security settings have been used and suggests a corrective action. Pressing the "A" button on the controller directs the logic to continue through connector "G" at the top of FIG. 4C, with step 342. If the wireless bridge has the correct security settings, a decision step 412 determines if the signal strength and speed of the wireless connection are greater than a minimum so that the wireless connection has acceptable transmission signal strength and speed. If the signal strength and speed are acceptable, the logic continues through connector "C" on FIG. 4A, with step 314. If the signal strength or speed is not acceptable, a step 414 indicates that a poor wireless connection has been made and displays information that may be helpful to correct the problem. Pressing the "A" button on the controller directs the logic to continue through connector "J" at the top of FIG. 4B, with step 336, as discussed above.

Exit Wireless Settings

If the user chooses to exit from the Wireless Settings display, the logic continues through connector "P" on FIG. 4A to a step 415, which indicates that the settings are not saved, and requests the user to confirm exiting the procedure. If the user selects not to confirm exiting wireless settings, the logic continues through connector "H" on FIG. 4C to return to the wireless settings display in step 342. Otherwise, the process returns to step 314.

Troubleshooting

A troubleshooting function is provided to assist the user in all aspects of the network connection and to provide assistance in various other functions of the game console. One function of this help feature that is pertinent to the present invention is the provision of troubleshooting logic to assist the user with problems associated with configuring XBOX™ compatible wireless bridges. There are two distinct pathways that lead to the troubleshooting logic. First, with reference to FIG. 4A, the user may initiate troubleshooting from a step 416, which displays an advanced option to enable a user to select a specific wireless network for which the wireless bridge is to be configured. If the user selects this option, the logic continues with step 308, which scans for available wireless networks. Alternatively, the user may go back to a step 418, which displays network settings and enables the user to select between options labeled Connect and Advanced. Selecting Advanced returns to step 416; selecting Connect proceeds to a step 420, which displays the network connect status data. These data include the cable status, IP of the wireless bridge, the domain name system (DNS) server IP, and whether the wireless bridge is connected to XBOX LIVE™. When the wireless bridge is configured and functioning correctly, it becomes essentially "invisible" on the network.

The second pathway to access troubleshooting assistance is followed if the Back To variable has been set to Troubleshoot and the process reaches decision step 318 in FIG. 4A. If this occurs, the process continues to step 420, which is discussed above.

Step 420 enables a user to select one of the parameters displayed. If the user selects Cables, a decision step 422 prompts the user to examine the physical connection to the wireless bridge through the Ethernet cable to determine if that cable is properly connected. If the physical connection of the Ethernet cable is not OK, a step 424 directs the user to correct the problem. The logic loops back to step 422, until the cable connection appears to be fixed. When the cable connection is OK, a step 426 requests a response from the wireless bridge.

If the wireless bridge is present, based upon it returning a response to the request, a decision step 428 determines whether the wireless bridge is connected to a wireless network and authenticated as being compatible to be configured by the game console.

If the wireless bridge is not connected to a wireless network or not authenticated as being compatible, a step 430 advises the user that a wireless bridge was detected but is not connected to a wireless network and gives the user the option to connect to a wireless network. This step gives the user the option to connect to the network. If the user chooses to connect to the network, the logic continues through connector "N" on FIG. 4B to step 344. Otherwise, the process ends at step 432, which indicates that the troubleshooting portion of the procedure is complete, but gives the user an option to request further help, which may return the user to step 430.

If the wireless bridge is connected and authenticated or if the wireless bridge was not found in step 426 on FIG. 4A, a step 434 continue with troubleshooting procedure and moves the user through various troubleshooting steps that may resolve other issues preventing the wireless bridge from being authenticated or connecting to a wireless network. Details of these steps are not particularly relevant to the present invention and they are therefore not included. The steps between step 428 and 436 in the troubleshooter are not limited specifically to wireless functionality—that address other connectivity problems that can occur in both wired and wireless connection scenarios.

If the troubleshooting procedure completes without error, i.e., if the problem has been corrected by working through the procedure so that the wireless bridge is connected to a wireless network and is authenticated, a decision step 436 determines if the signal strength and speed are above a predefined minimum. If the quality of the wireless connection is too poor, a step 438 directs the user to attempt to correct the problem and improve the signal strength by moving the wireless bridge about and gives the user the option to view the Wireless Status screen, which displays signal strength and connection speed, so that the user is provided feedback on the quality of the connection as the wireless bridge is moved about the environment. If the user does not choose to view the Wireless Status screen in step 314 or if the signal strength and speed increase above the predefined minimum by virtue of the moving the wireless bridge to a better position, the troubleshooting process ends at a step 440. The wireless bridge configuration is now complete, and the wireless bridge is connected to a wireless network.

Screen Displays

FIG. 5 illustrates an exemplary screen 500, which is displayed at step 314 (in FIG. 4A) to give the user information regarding the wireless status. Screen 500 includes a title 510 indicating "Wireless Status," and connection information in boxes 512a-512d that specify various parameters of the wireless connection. Box 512a specifies whether there is a wireless connection, box 512*b* specifies the network name, box 512*c* shows the connection speed, and box 512*d* indicates the relative signal strength of the wireless connection. Selectable options 514*a* and 514*b* indicate the choices available to the user with the "More" option being highlighted. A dialog box 516 provides added information regarding the highlighted option. Also included on screen 500 are an icon 506 for the "A" button on the handheld controller and an explanation 508 of its "Select" function, and an icon 502 for the "B" button on the handheld controller and an explanation 504 of its "Back" function. Thus, pressing the "A" button on the handheld controller will select the currently highlighted "More" option, which in this instance, will enable the user to "view more wireless network details."

FIG. 6 illustrates an exemplary screen 520, which is displayed at step 322 in FIG. 4B to notify the user that a wireless bridge was not detected. Screen 520 includes a title 522, indicating "No Wireless Bridge," a dialog box 524 showing various reasons why the adapter may not have been detected, and a highlighted OK option 526. Also included on screen 520 are icon 506 for the "A" button on the handheld controller and explanation 508 of its "Select" function and icon 502 for the "B" button on the handheld controller and explanation 504 of its "Back" function.

FIG. 7 illustrates an exemplary screen 530, which is displayed at step 336 in FIG. 4B to notify the user of communication difficulties with the wireless bridge. Screen 530 includes a dialog box 532 acknowledging technical difficulties in communicating with the wireless bridge and suggests a web site where the user may look for more information. A highlighted OK option 534 is provided the user. Since icons for the "A" and "B" buttons on the controller are unavailable on this screen, pressing either button will dismiss the screen and direct the system to its next state, as discussed above.

FIG. 8 illustrates an exemplary screen 540, which is displayed to give the user information and options regarding the wireless settings. Screen 540 includes a title 542, "Wireless Settings" and includes options in text boxes 544*a*-544*g* showing the choices available to the user. A "Save" option in text box 544*g* is highlighted. Box 542*a* lists the Network Name, box 542*b* indicates the Network Mode, box 542*c* identifies the Channel, box 542*d* indicates the Security Type, box 542*e* specifies the Security Key, box 544*f* provides an option for changing the Password, and box 544*g* can be selected to Save the settings. Also included on screen 540 are icon 506 for the "A" button on the handheld controller and explanation 508 of its "Select" function, and icon 502 for the "B" button on the handheld controller and explanation 504 of its "Back" function.

FIG. 9 illustrates an exemplary screen 550, which is displayed in step 352 of FIG. 4B to notify the user of detected wireless networks. Screen 550 includes a text box 552 showing that one or more wireless networks have been detected and the highlighted OK option 554 indicates a default choice available to the user. Because icons for the "A" and "B" buttons are unavailable on this screen, pressing either button will dismiss the screen and direct the system to its next state.

FIG. 10 illustrates an exemplary screen 560, which is displayed at step 354 in FIG. 4B to give a user an opportunity to select one of the wireless networks that are displayed. Screen 560 includes a title 562 "Select Network" and options in boxes 564*a*-564*c* showing the wireless network choices that were identified by the scan and are available to the user, with the "XLIVEMILLD2453TRISTANJ" option highlighted. A box 566 lists the option "Other," which can be selected to enable a user to manually identify a wireless network. Also included on screen 560 are icon 506 for the "A" button on the handheld controller and explanation 508 of its "Select" function, and icon 502 for the "B" button on the handheld controller and explanation 504 of its "Back" function.

FIG. 11 illustrates an exemplary screen 570, which is displayed at step 338 in FIG. 4B to give the user more information about the current selected wireless connection. Screen 570 includes a title 572 "Wireless Details," a dialog box 574 showing the details, and the OK option 576 (highlighted). Also included on screen 570 are icon 506 for the "A" button on the handheld controller and explanation 508 of its "Select" function and icon 502 for the "B" button on the handheld controller and explanation 504 of its "Back" function.

FIG. 12 illustrates an exemplary screen 580, which is displayed at step 368 to give about the opportunity to enter a password. Screen 580 includes a dialog box 582 explaining why a password is desirable, the highlighted option 584 Password, and the option 586 Save. Also included on screen 580 are icon 506 for the "A" button on the handheld controller and explanation 508 of its "Select" function, and icon 502 for the "B" button on the handheld controller and explanation 504 of its "Back" function. Thus, by pressing the "A" button on the handheld controller, the "Select" function will choose the "Password" option, which, in this instance, will enable the user to create a password.

FIG. 13 illustrates an exemplary screen 590, which is displayed at step 370 in FIG. 4C for entry of a password. A similar screen is displayed at step 360 in FIG. 4B (for entering a network name), at step 388 in FIG. 4C for entry of a security key, and at other steps where necessary to enable a user to enter data for various parameters. In this example, screen 590 includes a title 592 "Enter Password," a highlighted option 594 "Done," character options in boxes 596*a*-596*d*, and characters 598, including Space and Backspace characters. A character is selected by using cursor controls on the controller to highlight the desired character and then pressing the "A" button on the controller. Entering a single capital, all capitals, an accent, or a symbol is accomplished by selecting "Shift," "Caps Lock," "Accents," or "Symbols," respectively. When all the characters are entered, the option "Done" is selected. Also included on screen 590 are icon 506 for the "A" button on the handheld controller and explanation 508 of its "Select" function and icon 502 for the "B" button on the handheld controller and an explanation 504 of its "Back" function.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A bridge for connecting a gaming console to a wireless network wherein the gaming console is incapable of displaying a web page that includes hypertext markup language code, the bridge comprising:
   (a) a memory in which are stored authentication data, machine instructions, and a medium access control address, said authentication data being included to enable the bridge to be recognized as compatible for configuration through a gaming console, the authentication data comprising a key that is not publicly known;
   (b) a port adapted to couple the bridge to the gaming console through a wire connector;
   (c) a radio that includes a wireless receiver and a wireless transmitter that are coupled to an antenna system;

(d) a processor coupled to the memory, the port, and the radio, said processor executing the machine instructions to carry out a plurality of functions to connect the gaming console to a wireless network, wherein the gaming console is incapable of configuring the bridge through an interface that requires the display of a web page that includes hypertext markup language code, the functions including:

(i) receiving a discover request from the gaming console that is coupled to the bridge, wherein the discover request includes a one-time variable that is generated by the gaming console;

(ii) combining the one-time variable with the medium access control address to form a single concatenated component;

(iii) applying a one-way hashing algorithm to the single concatenated component producing a digest, the hashing algorithm using the key;

(iv) responding to the discover request from the gaming console by returning the digest and the medium access control address to the gaming console via the port to enable the gaming console to confirm a compatibility of the bridge for being configured with properties sent to the bridge by the gaming console;

(v) responding to a command received from the gaming console to set properties of the bridge so as to enable the bridge to subsequently communicate data to and from the gaming console over the wireless network; and (vi) communicating data between the gaming console and the wireless network.

2. The bridge of claim 1, wherein the machine instructions further cause the processor to respond to a request received from the gaming console to enumerate all available wireless networks by scanning for available wireless networks and returning a response to the gaming console that identifies an address for each access point of an available wireless network, and other parameters for each available network enumerated by scanning.

3. The bridge of claim 2, wherein the machine instructions further cause the processor to respond to the subsequent command received from the gaming console by setting the properties of the bridge as needed to communicate with an available network identified by scanning.

4. A method for automatically configuring a bridge to communicate over a wireless network, where the bridge is coupled through a wire connection to a gaming console, wherein the gaming console is incapable of displaying a web page that includes hypertext markup language code, the method comprising the steps of:

a gaming console sending a discover request over the wire connection to a bridge, wherein the discover request includes a one-time variable that is generated by the gaming console, the gaming console being incapable of configuring the bridge through an interface that requires the display of a web page that includes hypertext markup language code;

the bridge combining the one-time variable with a medium access control address to form a single concatenated component;

the bridge applying a one-way hashing algorithm to the single concatenated component producing a first digest, the hashing algorithm using a key that is not publicly known;

the bridge returning the digest and the medium access control address to the gaming console via the port to enable the gaming console to confirm a compatibility of the bridge for being configured with properties sent to the bridge by the gaming console;

the gaming console combining the one-time variable with the medium access control address received from the bridge and applying the one-way hashing algorithm using the key to produce a second digest;

comparing the second digest to the first digest received from the bridge such that upon determining that the first and second digest are equal, the gaming console verifies that the bridge is compatible with being configured using the properties sent by the gaming console;

upon confirming that the bridge is compatible, the gaming console sending a command to the bridge to set properties of the bridge so as to enable the bridge to subsequently communicate data to and from the gaming console over the wireless network; and the bridge communicating data between the gaming console and the wireless network.

5. The method of claim 4, further comprising the steps of:
sending a request from the gaming console to the bridge to scan for available wireless networks;

in response to the request to scan, scanning and enumerating all available wireless networks with the bridge; and returning a response from the bridge to the gaming console that identifies an address for each access point of each available wireless network enumerated in the step of scanning, and other parameters for each available network enumerated by the step of scanning.

6. The method of claim 5, further comprising the step of selecting an available wireless network on the gaming console and specifying the properties sent to the bridge for the wireless network that is selected.

7. The method of claim 4, further comprising the step of enabling a user to initiate configuration of the bridge by selecting an option in a program executed on the gaming console.

8. The method of claim 4, further comprising the step of enabling a user of the gaming console to selectively send a status request to the bridge, said status request indicating whether the bridge is connected in communication with a wireless network and if so, indicating a signal strength of wireless signals received by the bridge over the wireless network.

9. The method of claim 4, further comprising the step of enabling a user to selectively query the bridge for the properties with which the bridge is currently configured.

10. The method of claim 4, wherein after the bridge responds to the discover request, the bridge and the gaming console employ a unicast communication, based upon a media access control access address for the bridge and the gaming console.

11. The method of claim 4, further comprising the step of enabling a user to change selected properties of the bridge in a user interface displayed by the gaming console.

12. One or more memory media that store machine instructions for carrying out the method of claim 4.

13. A gaming console for setting up a bridge to communicate over a wireless network, wherein the gaming console is incapable of displaying a web page that includes hypertext markup language code, the gaming console comprising:

(a) a memory in which machine instructions are stored;

(b) a network interface and port used for connecting through a wire lead to a bridge;

(c) a processor coupled to the memory and the network interface, said processor executing the machine instructions to carry out a plurality of functions to connect the gaming console to a wireless network, wherein the gaming console is incapable of configuring a bridge through an interface that requires the display of a web page that includes hypertext markup language code, the functions including:

(i) sending a discover request to the bridge that is connected to the network interface through the port, wherein the discover request includes a one-time variable that is generated by the gaming console;

(ii) receiving a response from the bridge consisting of a first digest and a medium access control address;

(iii) combining the one-time variable with the medium access control address received from the bridge to form a single concatenated component;

(iv) applying a one-way hashing algorithm to the single concatenated component producing a second digest, the hashing algorithm using a key that is not publicly known;

(v) comparing the second digest to the first digest received from the bridge such that upon determining that the first and second digest are equal, the gaming console verifies that the bridge is compatible with being configured using the properties sent by the gaming console;

(vi) upon confirming that the bridge is compatible, sending a command to the bridge to set properties of the bridge so as to enable the bridge to subsequently communicate data to and from the gaming console over the wireless network; and (vii) communicating data over the wireless network through the bridge.

14. The gaming console of claim 13, wherein the machine instructions further cause the processor to send a request to the bridge to scan for available wireless networks.

15. The gaming console of claim 14, wherein the machine instructions further cause the processor to select an available wireless network and specify the properties sent to the bridge for configuring the bridge to communicate over the wireless network that is selected.

16. The gaming console of claim 13, wherein the machine instructions further cause the processor to enable a user to initiate configuration of the bridge by selecting an option in an operating system executed on the gaming console.

17. The gaming console of claim 13, wherein the machine instructions further cause the processor to enable a user of the gaming console to selectively send a status request to the bridge, said status request indicating whether the bridge is connected in communication with a wireless network and if so, indicating a signal strength of wireless signals received by the bridge over the wireless network.

18. The gaming console of claim 13, wherein the machine instructions further cause the processor to enable a user to selectively query the bridge for the properties with which the bridge is currently configured.

19. The gaming console of claim 13, wherein the machine instructions further cause the processor to enable a user to change selected properties of the bridge in a user interface displayed by the gaming console.

* * * * *